(12) United States Patent
Welker

(10) Patent No.: US 7,194,920 B2
(45) Date of Patent: Mar. 27, 2007

(54) SENSOR PROBE AND PIPELINE CONSTRUCTION AND METHOD

(75) Inventor: Brian H. Welker, Sugar Land, TX (US)

(73) Assignee: Welker Engineering Company, Sugar Land, TX (US)

(*) Notice: Subject to any disclaimer, the term of this patent is extended or adjusted under 35 U.S.C. 154(b) by 80 days.

(21) Appl. No.: 10/906,996

(22) Filed: Mar. 15, 2005

(65) Prior Publication Data

US 2006/0207344 A1    Sep. 21, 2006

(51) Int. Cl.
G01F 1/46    (2006.01)

(52) U.S. Cl. .................... 73/861.65; 73/204.21; 73/204.22; 73/204.26

(58) Field of Classification Search ........... 73/861.65, 73/204.21, 204.22, 204.26
See application file for complete search history.

(56) References Cited

U.S. PATENT DOCUMENTS

| | | | |
|---|---|---|---|
| 1,145,860 A | 7/1915 | Burnham | |
| 1,438,811 A | 12/1922 | Coyne | |
| 3,581,585 A | 6/1971 | Dieterich | |
| 3,914,997 A | 10/1975 | Pinckney | |
| 4,047,521 A | 9/1977 | Kramer et al. | |
| 4,346,611 A | 8/1982 | Welker | |
| 4,448,069 A | 5/1984 | Gibert | |
| 4,823,615 A * | 4/1989 | Taha | 73/861.66 |
| 4,928,536 A * | 5/1990 | Welker | 73/863.83 |
| 5,036,711 A | 8/1991 | Good | |
| 5,099,686 A | 3/1992 | Kohler | |
| 5,117,687 A * | 6/1992 | Gerardi | 73/170.15 |
| 5,233,865 A | 8/1993 | Rossow | |
| 5,241,866 A | 9/1993 | Rossow | |
| 5,406,855 A * | 4/1995 | Welker | 73/863.83 |
| 5,632,556 A * | 5/1997 | Sivyer | 374/138 |
| 5,756,906 A | 5/1998 | Welker | |
| 6,079,264 A * | 6/2000 | Yamakawa et al. | 73/204.26 |
| 6,253,606 B1 * | 7/2001 | Yonezawa et al. | 73/204.26 |
| 6,259,523 B1 | 7/2001 | Welker | |
| 6,338,359 B1 | 1/2002 | Welker | |
| 6,668,663 B2 | 12/2003 | May et al. | |
| 6,820,479 B2 * | 11/2004 | Roeckel et al. | 73/202.5 |

(Continued)

FOREIGN PATENT DOCUMENTS

JP        06258107        9/1994

OTHER PUBLICATIONS

Dieterich Standard Corporation; Annubar Flow Measurement Industrial Line; Catalog; May 1979; 29 pages; Section B; Dieterich Standard Corporation—Subsidiary of DOVER Corporation, Boulder, Colorado.

Primary Examiner—Edward Lefkowitz
Assistant Examiner—Freddie Kirkland, III
(74) Attorney, Agent, or Firm—Blackwell Sanders Peper Martin LLP; Lawrence E. Evans, Esq.

(57) ABSTRACT

A sensor and carrier device are provided in combination with a pipeline for either placing a sensor element within the flow stream of the pipeline or a device to divert flow outside of the pipeline to measure a parameter of the conditions within the pipeline or of the gas flowing through the pipeline. The configuration of the probe comprising the carrier and sensor is such as to reduce the possibility of structural failure of the probe.

18 Claims, 3 Drawing Sheets

U.S. PATENT DOCUMENTS

| | | | |
|---|---|---|---|
| 6,827,486 B2 * | 12/2004 | Welker | 374/147 |
| 6,941,805 B2 * | 9/2005 | Seidel et al. | 73/170.02 |
| 6,964,517 B2 * | 11/2005 | Welker | 374/147 |
| 2002/0108451 A1 | 8/2002 | May et al. | |
| 2004/0101025 A1 * | 5/2004 | Welker | 374/147 |
| 2004/0233969 A1 * | 11/2004 | Welker | 374/148 |

* cited by examiner

SENSOR PROBE AND PIPELINE CONSTRUCTION AND METHOD

BACKGROUND OF INVENTION

The present invention is directed to a pipeline construction and method of operation which presents a sensor to fluid in or from the flow stream of fluid flowing through the pipeline.

Pipelines are used to convey fluids (liquid and/or gas), for example, natural gas or other hydrocarbon gases and/or liquids and are well-known in the art. It is common in such pipelines to monitor various parameters of their operation. Examples of monitored parameters include pressure, temperature, fluid speed, energy content and sometimes the component mix of the fluid flowing through the pipeline. Typically this can be done in one of three broad ways. First, when it is desired to measure a parameter, a probe is temporarily installed in the line, the reading taken and the probe removed. However, oftentimes such an approach would require the shutting down of the pipeline to effect installation and removal of the probe. A second method is the use of a probe that is permanently or semi-permanently mounted to the pipeline having a portion thereof projecting into the interior of the pipeline. A third method is the use of a drive device to automatically, upon a given signal, for example, after a predetermined time period, insert the probe into the pipeline and remove the probe from the pipeline. All these methods are well known in the arts. See for example, U.S. Pat. Nos. 4,346,611, 5,756,906, 6,259,523 and 6,338,359.

Pipelines can contain delicate equipment therein, for example, a turbine type fluid speed monitoring device, valves and the like. Should a probe break loose, it can cause damage to equipment contained in the line in addition to requiring its repair or replacement. Oftentimes, gas is moved through pipelines at high and ultra high speeds, sometimes subsonic and sometimes supersonic. It has been found that in operation, the probe and possibly a sensor and its carrier can break from forces acting on the probe. To reduce bending moments, oftentimes the probes are short but this limits the location within the pipeline in which the parameter to be monitored can be sensed or extracted. The location of the sensing or sampling can affect the reading or output of the sensor usually carried by a carrier portion of the probe. For example, gas speed will vary with position transversely across the pipeline. Generally, in laminar flow, the gas speed profile will be a parabola with the maximum gas speed being in the center of the pipe and the minimum speed being at the pipe wall. Temperature may also vary depending upon where across the pipe cross section the measurement is taken. Likewise, pressure may also vary by where the reading is taken across the pipe. The longer the carrier, the greater the bending moment is that is applied to the measuring device because of the increased force from the increased surface area of the carrier and the longer moment arm due to the increased length of the carrier.

Another source of force application to a carrier and sensor is induced vibration. There may be two sources of vibration in a flow stream in a pipeline. One is the vibration of the pipeline from the fluid flowing therethrough which may be transmitted to the probe and carrier. Another source of vibration is caused by separation of the flowing fluid from the carrier as it moves around the carrier and, depending upon where the flow separates from the carrier, vortices will form on the "backside" or downstream side of the carrier. These vortices can induce vibration in the carrier and/or sensor, and should that vibration be resonant, can cause structural failure of the probe and perhaps damage to downstream equipment from the probe moving downstream with the flowing fluid.

Work has been done to try to prevent carrier and probe failure. Reference can be made to API 14.1.7.4.1 for probe design. A formula is provided for calculating the maximum length of a probe as a function of its outer diameter. The solution suggested by this publication is that to prevent damage from resonant vibration, the length of the probe should be limited in the manner described in the reference.

A brief discussion of vibration may also be found in Mark's Standard Handbook for Mechanical Engineers, $10^{th}$ Edition, at page 3–47.

A problem further complicating the design of carriers and sensors is that a pipeline is not constant in operation. The rate of flow, temperature and pressure change over time. The fluid in the pipeline may also change. Thus, a carrier and sensor designed to be acceptable only at one set of operating conditions may not always be appropriate for the pipeline since the operating conditions may change, complicating the solution to the problem of carrier design because one could not match the design of the carrier to operating conditions that would prevent resonant frequency vibration. It is pointed out that it is not clear, if it is resonant frequency vibration alone or in combination with other factors that causes the failure of carriers, although some in the art assume that it is, further complicating the solution to the problem of carrier failure.

Thus, there is a need for an improved probe design that will reduce the risk of probe failure.

SUMMARY OF THE INVENTION

The present invention involves the provision of a pipeline construction comprising a section of pipe and a probe configured to reduce the risk of failure.

The present invention also provides for a method of measuring or monitoring a gas pipeline operating parameter.

BRIEF DESCRIPTION OF THE DRAWINGS

Like reference numerals throughout the various Figures designate like or similar parts or constructions.

DETAILED DESCRIPTION

Figure 1:
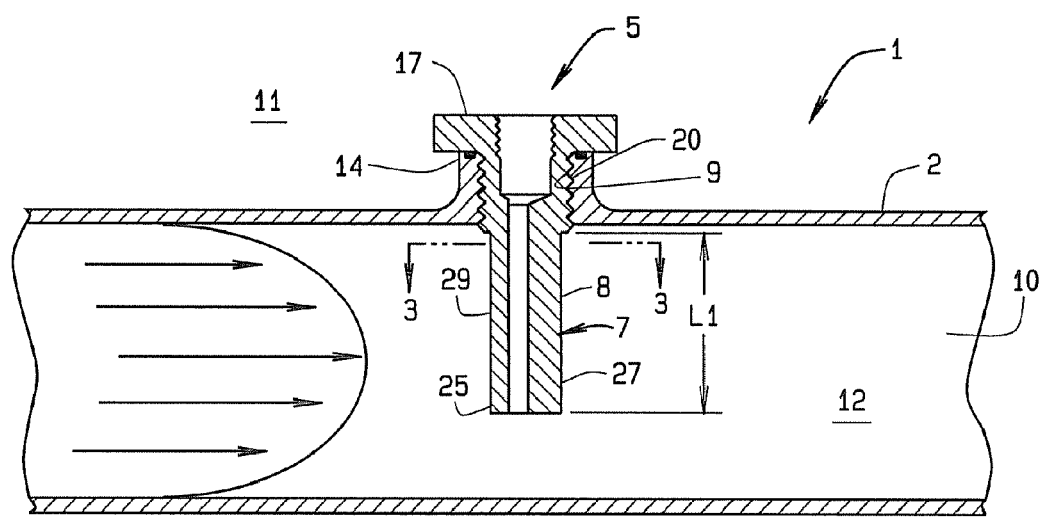
FIG. 1 is a side elevation view in cross section showing a pipeline and a probe mounted thereto.
Figure 2:
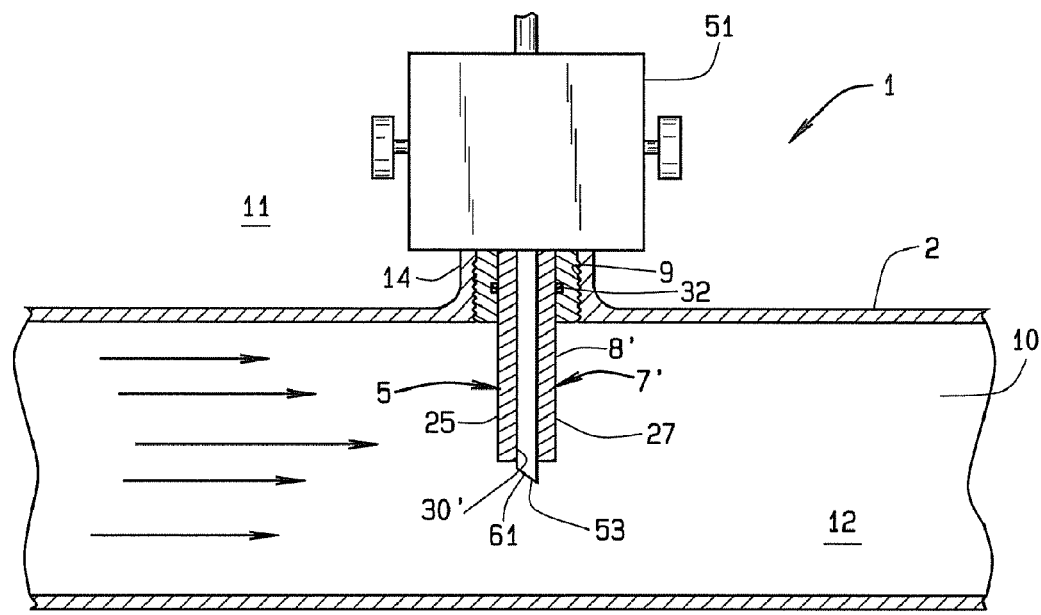
FIG. 2 is a side elevation view of a pipeline with a probe mounted thereto showing a power-driven auto insertion device connected to the probe.

The referenced numeral 1 designates generally a pipeline construction comprising at least one pipe section 2 through which fluid flows. The fluid may be gas, liquid or a combination thereof. In a preferred embodiment of the present invention, the fluid flowing through the pipeline 1 is a hydrocarbon gas such as natural gas, methane, propane and the like which may contain liquid(s). In laminar flow, and as seen in FIG. 1, the fluid speed profile is generally in the shape of a parabola as seen on the left-hand end of the pipe section 2 in FIG. 1. Flow speeds, on average across the flow path, are on the order of at least about 50 ft/sec, up to several hundred ft/sec, and in the case of natural gas, can be on the order of approximately 100 ft/sec. The pipe sections 2 are typically round and the diameter of the pipe section can be any suitable diameter ranging from on the order of 2 inches to 24 inches or can be even larger. The length of such pipelines 1 can be in the miles or hundreds of miles. At certain locations along the length of the pipeline 1, various measuring or monitoring devices 5 are provided in or associated with the pipeline construction at mounting locations provided for the use of such devices 5. Measuring or monitoring devices 5 may include a sensor device 6, FIG. 5, such as pressure sensors, temperature sensors, fluid speed sensors, chemical analysis, energy content and the like, as are well known the art, may be provided. The sensor 6 may have at least a portion in the interior 12 of the pipe section 2 or may be external of the interior. As best seen in FIGS. 1 and 2, a measuring device, designated generally 5, is mounted to the pipe in any suitable manner. As seen in FIG. 1, the device 5 includes an elongate probe 7 suitably mounted to the pipe section 2 and extends through a port 9 into the interior 12 of the pipeline 1 and pipe section 2. The probe 7 includes a carrier portion 8 adapted to receive and support a sensor 6 or other device. The carrier portion 8 may also be a device itself, e.g., a flow stream diverter with a diversion channel in flow communication with an external instrument as described below in reference to the structure of FIGS. 2 and 6. The port 9 provides an opening providing access between the exterior 11 and interior 12 of the pipeline 1 and pipe section 2. The mounting of the device 5 to the pipe section 2 may be by any suitable means as is known in the art, e.g., threaded, welded or a flange connection. As shown in FIG. 1, a coupling collar 14 is made part of the pipeline 2 as, for example, by mechanical attachment, integral formation therewith, welding or the like. The device 5 includes a mounting connector 17 to which the probe 7 is secured in a sealed manner. The mounting of the probe 7 to the connector 17 can be by a permanent mounting as by welding or other form of permanent securement, or non-permanent mounting such as frictional engagement and threaded connectors and is preferably sealed to prevent the escape of fluid from the interior 12 to the exterior 11. Such connections are well-known in the art. The connector 17 can be provided with a hexagonal shape for using a wrench to effect threaded engagement at 20 between the connector 17 and collar 14. The mounting may also be non-permanent or temporary. Such connection can be effected through the use of pipe threading and sealant such as tape made from polytetrafluoroethylene (PTFE). Such mountings are well-known in the art. Carrier 8 has an exposure length L1 which is an exposed length to the interior 12 as shown in FIG. 1. The carrier 8 has a leading edge 25 and a trailing edge 27 with the leading edge 25 being on the upstream side of the carrier 8 and the trailing edge 27 being on the downstream side of the carrier 8. The probe 7, as seen for example in FIGS. 3, 4, includes an outer sheath 29, 29A respectively forming a portion of the carrier 8 with a longitudinally extending channel 30, 30A respectively with a sensor device 6 therein. The sensor device 6 may be in the form of a thermocouple, strain gage pressure measuring device or other sensor devices. The channel 30, 30A may be used to function as a pitot tube, or a device to measure the constituents of the flowing fluid, for example, an energy meter, or the like. Such sensors are well-known in the art and may be acquired from Welker Engineering of Sugar Land, Tex.

Figure 3:
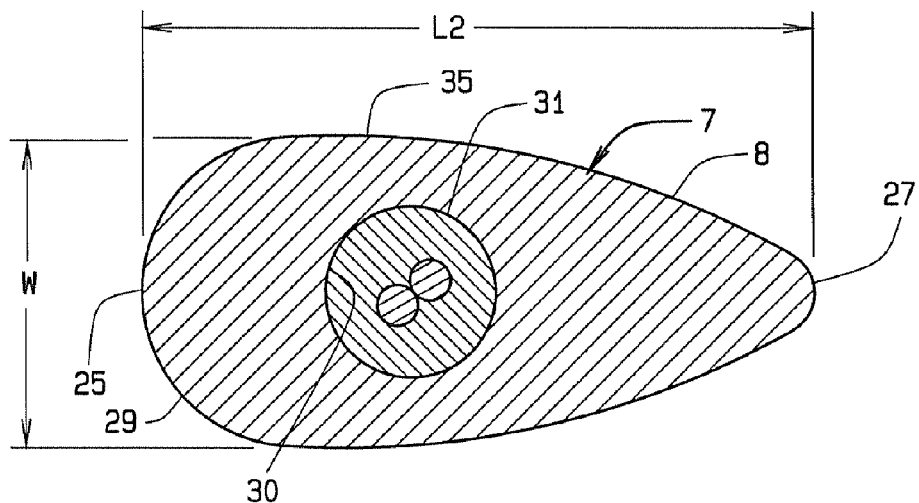
FIG. 3 is a sectional view taken along the line 3—3 FIG. 1 of the one form of probe carrier.
Figure 4:
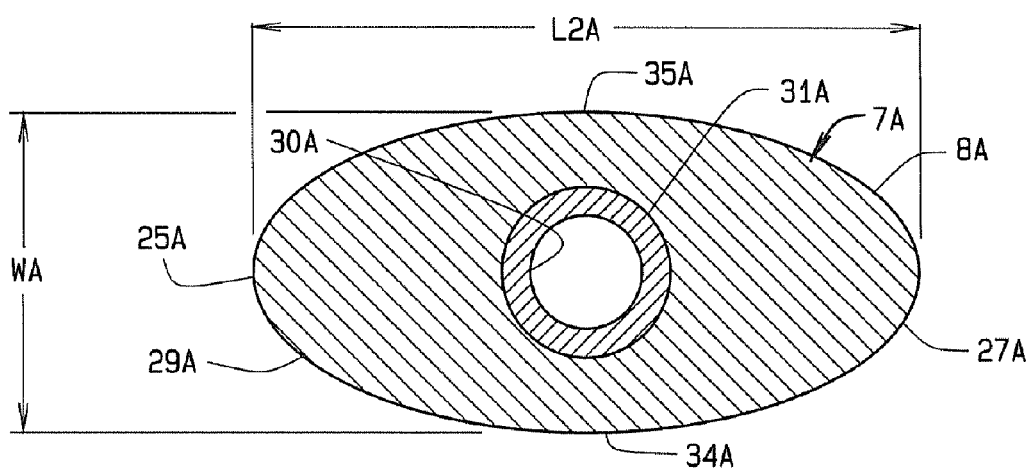
FIG. 4 illustrates an alternative embodiment of cross sectional shape for the probe carrier as seen in FIG. 3.

At least a portion, and preferably a majority of the length L1 of the carrier 8 that is exposed to the flow path of fluid within the interior 12, is configured as by cross sectional shape and/or surface treatment, e.g., dimpling or roughening as discussed below. Preferably, the entirety of the length L1 is uniformly shaped or relatively uniformly shaped as seen in transverse cross section, as for example, in FIGS. 3–5. A uniform cross section helps effect simple sealing as with a resilient seal 32 such as an elastomeric O-ring, FIG. 2. The cross sectional shape, as for example as seen in FIG. 3, has a length L2, which is measured in the general direction of flow of the fluid through the pipeline interior 12, extending between the leading edge 25 and the trailing edge 27 along the longitudinal axis of the transverse cross section. The carrier 8 also has a width, W, as measured as the maximum width in a direction transverse to the length L2. The ratio of L2 to W should be at least about 1.5:1, preferably at least about 2:1, and most preferably, at least about 3:1. The carrier 8 has its longitudinal axis generally normal to the longitudinal axis of the pipe section 2 and is generally normal to the general direction of fluid flow in the pipe section 2. The contour of the leading edge 25 is preferably generally arcuate or generally round while the trailing edge 27 may be any suitable shape and can be rounded as seen in FIGS. 3, 4 or pointed. Preferably, the side surfaces 34, 35 generally converge from behind the leading edge 25 toward the trailing edge 27 along at least a portion of the length L2 of the carrier 8. As seen in FIG. 4, convergence starts at about the midpoint of L2A.

To effect an appropriate configuration, discussed above, if desired, the leading edge 25 may be roughened, as for example, by knurling, dimpling or other means of forming a roughened leading surface to move the point of flow separation farther back along the sides 34, 35 to a point more toward the trailing edge 27 than without roughening. Roughening may permit a change in the above-described length to width ratio allowing reduction in the length to width ratio as defined above.

Figure 7:
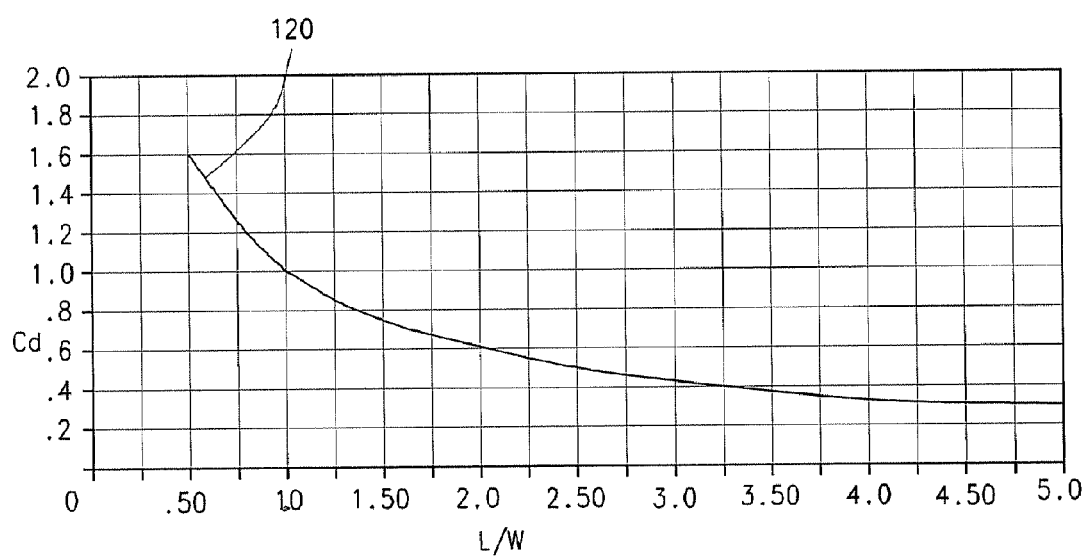
FIG. 7 is a graph showing a relationship between drag coefficient and the probe length to width ratio at a Reynold's Number of 50,000.

The probe 7, at least for the carrier portion 8 extending into the interior 12 of the pipeline 1, has a drag coefficient, when the leading edge 25 and longitudinal axis of the transverse cross section are pointed upstream. FIG. 7 shows a relationship between drag coefficient and the ratio of the length L2 to the width W (denoted generically as L/W on FIG. 7 in conformance with standard nomenclature.) The drag coefficient is less than about 0.7, preferably less than about 0.6, and most preferably less than about 0.4 when measured at a Reynolds number of 50,000. A description of drag coefficient (also referred to as absolute drag coefficient) may be found in Marks' Standard Handbook for Mechanical Engineers, Tenth Edition at pages 11–67, 68. There, drag coefficient, $C_d=D/qS$ where D is drag, q is dynamic pressure and S is the maximum cross section. As used in this specification and in the claims, the term drag coefficient is the drag coefficient value as measured at a Reynolds number of 50,000 even though the Reynolds number of the fluid in the pipeline may be higher or lower than 50,000. The drag coefficient will vary as the Reynolds number varies for the same transverse cross sectional probe shape. Further, by use of the configuration, such as those shown in FIGS. 3–5, a larger moment of inertia is provided than for a round tube because of the increased dimension L2 relative to a round tube having the same diameter as the width W.

The cross sectional configuration of the carrier 8 is such as to keep the separation of the flow around the probe from becoming turbulent far enough toward the trailing edge 27 so as to reduce the induced vibrations to above or below a resonant frequency for the carrier 8. For a round probe, the maximum recommended probe length as set forth in API 14.1.7.4.1 may be calculated in accordance with the following equation:

$$L^2 = [(Fm \times 4.38 \times OD \times 10)/(S \times V)] \times [(E/r) \times (OD^2 + ID^2)]^{1/2}$$

Where:
L=Permissible Probe Length (mm)
Fm=Virtual mass factor—a constant to take into account of the extra mass of the cylinder due to the fluid surrounding it and vibrating with it.
OD=OD of Probe (mm)
ID=ID of Probe (mm)
S=Strouhal number=dependent on the Reynolds No. & shape of the cylinder, but can be taken as 0.4 for worst case or 0.2 as suggested by API Chapter 8.
V=Velocity of fluid (m/sec)
E=Modulus of Elasticity of probe material (kg/cm$^2$)
ρ=Density of probe material (kg/m$^3$)

According to the American Engineering System, the equation is:

$$L = [[(Fm \times 1.194 \times OD)/(S \times V)] \times [(E/r) \times (OD^2 + ID^2)]^{1/2}]^{1/2}$$

Where:
L=Recommended probe length (Inches)
Fm=Virtual mass factor—For a gas, Fm=1.0 and for water and other liquids Fm=0.9
OD=OD of probe (Inches)
ID=ID of probe (Inches)
S=Strouhal Number=Use 0.4 as worst case
V=Velocity of fluid (ft/sec)
E=Modulus of elasticity of probe material (per psi)
ρ=Density of probe material (g/cc)

Other methods of determining the maximum length are disclosed in the referenced API publication. The probe depth L1 is shown in FIG. 1 and is L in both of the above equations.

When the shape of the carrier 8 is not uniform about a center point as is a round carrier, the carrier needs to be oriented where the leading edge 25 is pointed upstream and a line between the central point of the leading edge 25 and the trailing edge 27 (the longitudinal axis of the transverse shape) is generally parallel to the side wall portions of the pipe section 2 in which it is mounted, which is also generally parallel to the direction of flow within the pipe section 2, assuming a laminar flow.

Resonant frequency or a close approximation may be calculated as in the specific example below.

| Probe Calculations | |
|---|---|
| Probe Dimensions | ¾ × .125 wall |
| Pipeline Diameter | 6 inch |
| Riser Length | 15 inches |
| Line Velocity (V) | 5.77 m/s (the average speed across the pipeline) |
| Virtual Mass Factor ($f_n$) | 0.9 |
| Fluid Density (pf) | 999 kg/m3 at line pressure and temperature |

| -continued | |
|---|---|
| Probe Dimensions | |
| Outside Diameter (OD) | 0.75 inch 19.05 mm |
| Inside Diameter (ID) | 0.5 inch 12.7 mm |
| Insertion Length (L) | 17 inch 431.8 mm |
| Exposed Length (Le) | 2 inch 50.8 mm |
| Density Probe Material | 7800 kg/m3 (316 ss) |
| Modulus of Elasticity (E) | 1960000 kg/cm2 (316 ss) |
| Strouhal Constant (S) | 0.2 |
| Drag Coefficient (Cd) | 1.5 |
| Yield Strength (Se) | 207 N/mm2 (316 ss) |
| Vortex Shedding Natural Frequency | |
| Natural Frequency | $(f_n) = f_m \times [43800/L^2) \times [E \times (OD^2 + ID^2)/P)^{0.5}$ |
| Natural Frequency Shed Frequency | $(f_n)$ 77 Hz |
| Shed Frequency | $(f_s) = (S \times V)/OD \times 1000$ |
| Shed Frequency Result | $(f_s) = 61$ Hz |
| $f_s/f_n \times 100 = 79\%$ $f_s = f_n$ at 7.31 m/s | |

Oscillation occurs when fs=fn. As above calculations show that they are not equal, the probe is not subject to resonance at its natural frequency and will not fail due to resonant vibration effects.
Bending Stress
Drag Force on Probe
The following fluid creates a pressure difference of:

$$\text{delta } P = Cd \times \tfrac{1}{2} \times pf \times V^2$$

delta P=
Where:

$$Cd \text{ Drag Coefficient of blu } Cd = \frac{F/A}{pf \times (V^2/2)}$$

A Reference area
D Reference width
Re Reynolds Number Re=(υ×D)/μ
υ Free stream velocity
pf Fluid Density
μ Fluid kinematic viscosity
Drag Force exerted parallel to approach flow.
L/D=22.67
Cd=1.5 Maximum plus buffer
ΔP=24945 Nm$^2$
0.024945 Nmm$^2$
Bending Moment
This pressure difference acts as a drag force on the probe creating a bending moment at the support point.

$$M = \Delta P \times Le \times OD \times (L - 0.5 \times Le)$$

M=9810.492 Nmm
Bending Stress
The section Modulus for a hollow cylinder is given by:

$$Z = PI/32 \times (OD^4 - ID^4/OD)$$

Z=544.646 mm$^3$
Resulting in a bending stress (Sb) of:
Sb=M/Z
Sb=18.013 N/mm$^2$
Result Se=207 N/mm$^2$ Since flow induced bending stress (Sb) is below the yield strength (Se) of the probe material, the probe will not fail due to gas flow induced bending stress.

For Re>10000

| L/D | Cd |
|---|---|
| 1 | 0.64 |
| 1.98 | 0.68 |
| 2.96 | 0.74 |
| 5 | 0.74 |
| 10 | 0.82 |
| 20 | 0.91 |
| 40 | 0.98 |
| Infinity | 1.2 |

FIG. 2 shows an alternative embodiment of the present invention. As compared to FIG. 1, the device of FIG. 2 includes a power drive 51 for effecting insertion of the probe 7' and extraction of the probe 7' from the interior 12. Such power drives 51 are well-known in the art, an example of which is a Welker Model AID-3 and is disclosed in U.S. Pat. Nos. 4,631,967, and 6,761,757 the disclosures of which are incorporated herein by reference. The carrier 8' may be inserted by the power drive 51 upon an automated command or a manual command to either effect repair or replacement of the probe 7' or to have the probe 7' in the interior 12 only during the time when an operating parameter is being measured or monitored. The probe 7' is sealed by the seal 32.

As seen, the probe 7' has its free-end 53 beveled and being sloped downwardly from its leading edge 25 towards its trailing edge 27. In such a construction, the probe 7' can function as a pitot tube by having the opening or channel 30' therethrough having its open end 61 facing at least partially upstream. The channel 30' can then be a portion of a sensor 6. It can also be part of a diverter, described below.

Figure 5:
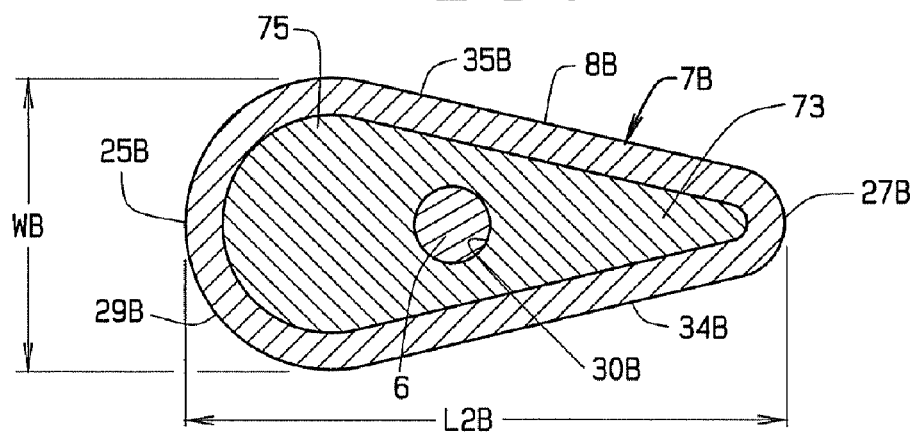
FIG. 5 is a second alternative cross sectional shape and construction of probe carrier.

FIGS. 3–5 illustrate various transverse cross sectional shapes and constructions of the probe 7. As seen in FIG. 4, the transverse cross sectional shape is oval, and the probe is designated 7A. Parts or components in FIGS. 4, 5 that are similar to the corresponding part or component in FIG. 3 are designated with postscript A or B. As best seen in FIG. 5, the transverse cross sectional shape of the carrier 8B is generally a teardrop.

FIG. 5 shows another alternative embodiment of the present invention. The probe 7B has a carrier member 8B in the form of a thin wall tubular member having a hollow interior section 73. The tubular portion of carrier 72 is preferably thin walled and can be machined or formed as for example as pipe is formed. The thickness of the wall of the carrier 8B may be on the order of about 0.02 inches or greater. Preferably the thickness is on the order of about 0.05 inches to about 0.075 inches for carriers having a cross sectional area of about 0.3 to about 1.0 square inch. The tubular portion of carrier 8B is preferably formed of a metal or metal alloy such as stainless steel. It may also be made of other suitable materials or a combination of materials including composites. The hollow interior 73 may contain a suitable casting or polling material 75 to help hold the sensor 6 in place. The filler 75 may also be in the form of a foam material. The filler 75 can be provided with a passage or channel 30B therethrough for the mounting of the sensor 6. The carrier 8B may be open at both ends and suitably sealed at least on the exposed end with the filler 75. Preferably, the interior 73 has a generally uniform cross sectional shape to facilitate manufacture of the carrier 8B of the probe 7B.

Figure 6:
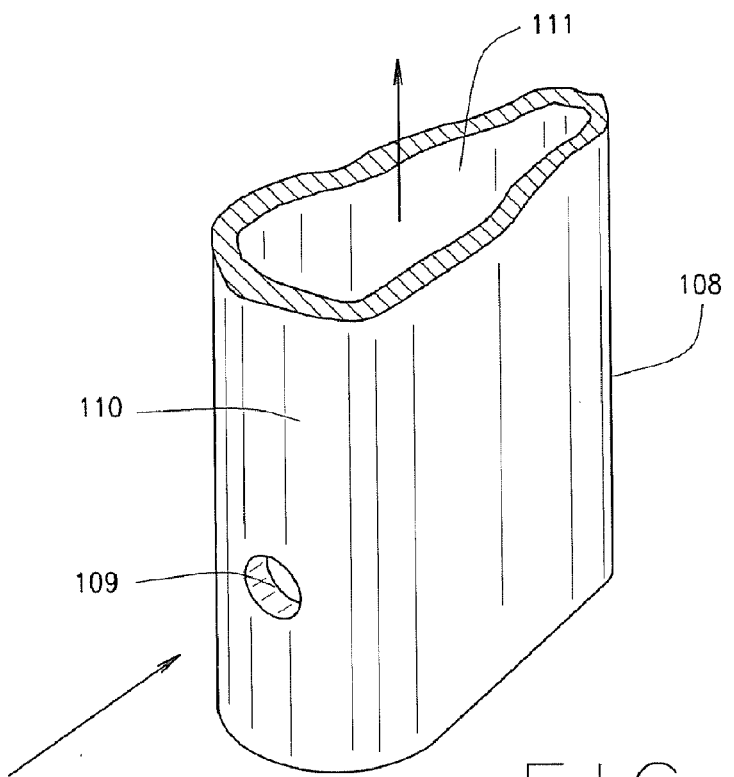
FIG. 6 is a fragmentary perspective view of an alternative embodiment of sensor which is adapted to divert fluid flow.

A flow stream diverter is shown in FIG. 6. In this embodiment, the carrier 108 has a through opening 109 in the wall 110 which provides for flow of a portion of the flow stream through the opening 109 and into the flow path 111 in the carrier 108. The fluid in the flow path 111 may be conducted to test equipment outside the pipeline 1 by a suitable conduit, not shown for further processing or testing.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or may include and not as "required." Many changes, modifications, variations and other uses and applications of the present construction will however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A pipeline construction for transporting fluid, said pipeline including:
   at least one section of pipe defining an interior forming a fluid flow path;
   a port in said pipe forming an opening communicating between the interior and an exterior of the pipe; and
   a probe device mounted to the pipe adjacent said port, said probe device including a probe with at least a portion positioned in the interior, said probe portion in the interior including a carrier portion with a free end in the interior spaced from the pipe and having a transverse cross sectional shape oriented to the direction of flow in the flow path with a drag coefficient of less than about 0.7 along at least a substantial portion of the length of the carrier portion in the interior.

2. A pipeline construction as set forth in claim 1 wherein the drag coefficient is less than about 0.6.

3. A pipeline construction as set forth in claim 1 wherein the drag coefficient is less than about 0.4.

4. A pipeline construction as set forth in claim 1 wherein the carrier portion adapted to position a sensor in the pipe interior.

5. A pipeline construction as set forth in claim 4 wherein said carrier portion having a transverse cross section shape oriented to the direction of flow in the flow path with a drag coefficient of less than about 0.7 along at least substantially the entire length of the carrier portion in the interior.

6. A pipeline construction as set forth in claim 1 wherein the carrier portion including a diverter operable to receive a flow stream portion therein from the interior of the pipe.

7. A pipeline construction as set forth in claim 6 wherein said carrier portion having a transverse cross sectional shape oriented to the direction of flow in the flow path with a drag coefficient of less than about 0.7 along at least substantially the entire length of the carrier portion in the interior.

8. A pipeline construction for transporting fluid, said pipeline including:
   at least one section of pipe defining an interior forming a fluid flow path;
   a port in said pipe forming an opening communicating between the interior and an exterior of the pipe; and a probe device mounted to the pipe adjacent said port, said probe device including a probe with at least a carrier portion positioned in the interior from adjacent the pipe to a carrier portion free end, said carrier portion positioned in the interior having a leading edge surface portion, a trailing edge and side surface portions extending therebetween, said leading edge surface portion being transversely curved and the carrier portion having a transverse cross section shape with a maximum length and maximum width ratio of at least about 1.5:1 along at least a substantial portion of the length of the carrier portion, said maximum length being measured on an axis generally parallel to the longitudinal axis of the pipe section.

9. A pipeline construction as set forth in claim 8 wherein the length to width ratio is at least about 2:1.

10. A pipeline construction as set forth in claim 8 wherein the length to width ratio is at least about 3:1.

11. A pipeline construction as set forth in claim 8 wherein the carrier portion adapted to position a sensor in the pipe interior.

12. A pipeline construction as set forth in claim 11 wherein said carrier portion having a transverse cross sectional shape with a maximum length to maximum width ratio of greater than about 1.5:1 along at least substantially the entire length of the carrier portion.

13. A pipeline construction as set forth in claim 8 wherein said carrier portion including a diverter operable to receive a flow stream portion therein from the interior of the pipe.

14. A pipeline construction as set forth in claim 13 said carrier portion having a transverse cross sectional shape maximum length to maximum width ratio of greater than about 1.5:1 along at least substantially the entire length of the carrier portion.

15. A pipeline construction for transporting fluid, said pipeline including:
   at least one section of pipe defining an interior forming a fluid flow path;
   a port in said pipe forming an opening communicating between the interior and an exterior of the pipe; and
   a probe device mounted to the pipe adjacent the port, said probe device including a probe with at least a carrier portion positioned in the interior extending from adjacent the pipe to a carrier portion free end, said carrier portion in the interior having an exterior exposed for contact with fluid within the interior and having configuration and orientation to the direction of flow in the flow path to provide a drag coefficient of less than about 0.7 along at least a substantial portion of the length of the carrier portion in the interior.

16. A method of operating a pipeline for transporting fluid, said method including:
   moving fluid along a flow path in an interior of a pipeline;
   moving at least some of the fluid by a probe portion in said interior in the flow path, said probe portion having a carrier portion in the interior with a drag coefficient of less than about 0.7 along at least a substantial portion of the carrier portion in the interior; and
   measuring at least one of a fluid property and pipeline operating condition with a sensor associated with the probe portion.

17. A method as set forth in claim 16 wherein the sensor associated with the probe portion is positioned in the interior.

18. A method as set forth in claim 16 including flowing a portion of the fluid into an interior portion of the probe portion.

* * * * *